(12) United States Patent
Daunois et al.

(10) Patent No.: US 8,074,941 B2
(45) Date of Patent: Dec. 13, 2011

(54) AIRCRAFT FLIGHT CONTROL

(75) Inventors: Stephane Daunois, Pelissanne (FR); Michel Corre, Carry le Rouet (FR)

(73) Assignee: Eurocopter, Marignane Cedex (FR)

( * ) Notice: Subject to any disclaimer, the term of this patent is extended or adjusted under 35 U.S.C. 154(b) by 421 days.

(21) Appl. No.: 12/402,868

(22) Filed: Mar. 12, 2009

(65) Prior Publication Data
US 2009/0230252 A1 Sep. 17, 2009

(30) Foreign Application Priority Data

Mar. 13, 2008 (FR) ...................................... 08 01380

(51) Int. Cl.
*B64C 13/04* (2006.01)
(52) U.S. Cl. ..................... 244/237; 244/234; 74/471 XY
(58) Field of Classification Search .................. 244/237, 244/220, 234, 221, 230, 229; 74/471 XY, 74/471 R
See application file for complete search history.

(56) References Cited

U.S. PATENT DOCUMENTS

| | | | | |
|---|---|---|---|---|
| 1,239,837 | A | * | 9/1917 | Sperry ........................... 244/177 |
| 3,409,252 | A | | 11/1968 | Miller |
| 3,541,877 | A | * | 11/1970 | Houk ....................... 74/471 XY |
| 3,703,267 | A | | 11/1972 | Oliver |
| 4,134,560 | A | * | 1/1979 | Messerschmidt ............. 244/234 |
| 4,716,399 | A | | 12/1987 | Nordlund |
| 4,947,701 | A | | 8/1990 | Hegg |
| 5,050,449 | A | * | 9/1991 | Falcou et al. .................... 74/625 |
| 5,125,602 | A | * | 6/1992 | Vauvelle ......................... 244/223 |
| 5,149,023 | A | * | 9/1992 | Sakurai et al. ................. 244/229 |
| 5,279,376 | A | * | 1/1994 | Yang et al. .................... 180/6.48 |
| 5,456,428 | A | * | 10/1995 | Hegg ............................. 244/229 |
| 5,497,847 | A | * | 3/1996 | Ota et al. ....................... 180/333 |
| 2006/0186262 | A1 | | 8/2006 | Fenny et al. |
| 2009/0229396 | A1 | * | 9/2009 | Taylor et al. ............. 74/471 XY |

FOREIGN PATENT DOCUMENTS

| | | |
|---|---|---|
| EP | 0 164 216 | 12/1985 |
| EP | 0 522 623 | 1/1993 |
| EP | 0 565 757 | 10/1993 |
| FR | 604 820 | 5/1926 |

OTHER PUBLICATIONS

French Search Report dated Oct. 29, 2008, from corresponding French Application.

* cited by examiner

*Primary Examiner* — Benjamin P Lee
(74) *Attorney, Agent, or Firm* — Brooks Kushman P.C.

(57) ABSTRACT

An aircraft flight control (10) includes a control stick (11) with a handle (14) and a root (13) that are interconnected by an intermediate segment (12) of the control stick (11). The flight control (10) includes a pitch shaft (20) and a roll shaft (30) that are mutually perpendicular, the control stick (11) passing through an oblong orifice (21) formed in the pitch shaft (20), the root (13) being mechanically connected to the roll shaft (30) by a mechanical connection (40), while the intermediate segment (12) is connected to the pitch shaft (20) via a connection pin (70) that passes through the intermediate segment (12) and that is arranged axially in the oblong orifice (21).

13 Claims, 3 Drawing Sheets

AIRCRAFT FLIGHT CONTROL

FIELD OF THE INVENTION

The present invention relates to a flight control for an aircraft, in particular for a helicopter.

BACKGROUND OF THE INVENTION

Conventionally, the flight controls of an aircraft include a control stick.

The control stick is then connected to flight control members of the aircraft via a control line that may be mechanical, or electrical in modern aircraft. By moving the control stick from front to back and from left to right, the pilot can control the aircraft being piloted.

More particularly, a helicopter has a main lift and propulsion rotor that has a plurality of blades.

By adjusting collectively and identically the pitch of the blades, the pilot varies the magnitude of the overall lift of the main rotor so as to control the altitude and the speed of the helicopter. The pilot performs this action with the help of a collective flight control implementing a pitch lever that is commonly referred to as the "collective pitch lever".

In contrast, by controlling the cyclical variation of the pitch of the blades with the cyclical flight control stick, which stick is referred to below as the "control stick", the pilot controls the attitude of the aircraft and its movement in translation.

As a result, helicopters are generally provided with a swash plate comprising a rotary plate and a non-rotary plate. The rotary plate is connected to the blade via pitch levers, while the non-rotary blade is connected to servo-controls that are themselves controlled by the pilot's flight controls via electrical or mechanical transmission means.

By moving the control stick from front to back, the helicopter pilot controls in pitching the helicopter. And likewise, by moving the control stick from left to right, the pilot controls the roll of the helicopter.

It can be understood that the controls need to be precise in order to avoid leading to incidents.

Unfortunately, with certain prior flight controls, coupling is observed to appear between the pitch and roll controls. Specifically, by moving the control stick forwards, for example, it is found that the pilot modifies both pitch and roll simultaneously as a result of the dynamics of the control stick.

Document EP 0 522 623 discloses a flight control provided with a pitch and roll control stick suitable for avoiding the above-specified coupling phenomenon.

The bottom end of the control stick is hinged to a support that is fastened to the floor of the aircraft. In addition, a roll control rod is hinged to a projection secured to said bottom end.

Furthermore, a pitch control rod is mechanically connected to an intermediate segment of the control stick via first and second cranks.

More precisely, the pitch control line comprises in succession: the control stick, the first crank, the second crank, and then the pitch control rod.

The device described in that document EP 0 522 623 suggests isolating the pitch and roll controls in order to solve the problem.

Nevertheless, it is found that the device is bulky, with the pilot facing different flight control members.

OBJECT AND BRIEF SUMMARY OF THE INVENTION

An object of the present invention is thus to propose flight controls that are compact, having a control stick that does not run any risk of generating the above-mentioned coupling phenomenon.

According to the invention, a flight control for an aircraft, more particularly for a helicopter, comprises a pitch and roll control stick suitable for being turned about an axis dedicated to pitch, referred to for convenience below as the pitch axis, and about an axis dedicated to roll, referred to below for convenience as the roll axis, the pitch and roll axes being mutually perpendicular, and the control stick being provided with a handle and a root that are interconnected by an intermediate segment of the control stick.

The flight control is remarkable in that it includes a pitch shaft and a roll shaft that are mutually perpendicular for controlling the aircraft in pitching and rolling by performing rotary movements respectively about the pitch axis and about the roll axis under drive from the control stick, the control stick also passing through an oblong orifice formed in the pitch shaft, and the root of the control stick being mechanically connected to the roll shaft by a mechanical connection while the intermediate segment is connected to the pitch shaft via a connection pin that passes through the intermediate segment and that is arranged axially in the oblong orifice on the roll axis.

Consequently, this compact flight control enables pitching and rolling to be decoupled.

When the pilot moves the control stick to pivot about the roll axis, the control stick turns about its connection pin, the connection pin being constituted for example by a bar having its longitudinal axis of symmetry coinciding with the roll axis. Consequently, the root of the control stick acts on the mechanical connection which in turn entrains the roll shaft to turn about said roll axis.

Furthermore, in the oblong orifice of the pitch shaft, the control stick can move only from left to right or from right to left, and therefore does not entrain the pitch shaft.

In contrast, when the pilot moves the control stick so that it pivots about the pitch axis, the control stick cannot turn about the connection pin, but instead pushes the connection pin and entrains turning movement of the pitch shaft about the pitch axis.

Furthermore, the mechanical connection does not cause the roll shaft to move.

The pitch and roll controls are therefore completely decoupled.

In order to optimize compactness, the flight control includes a main anchor platform anchoring it to the aircraft, the pitch and roll shafts optionally being fastened to the main anchor platform in such a manner as to perform turning movements respectively about the pitch and roll axes.

More precisely, the pitch and roll shafts have respective first and second ends, the first and second ends of the roll shaft being fastened respectively to the structure of the aircraft and to a first side face of the main anchor platform via hinges allowing said roll shaft to turn about the roll axis.

Likewise, the first end of the pitch shaft is fastened to the structure of the aircraft by a hinge allowing said pitch shaft to turn about the pitch axis, while the second end of the pitch shaft passes through a second side face of the main anchor platform, said first and second side faces being mutually perpendicular.

In addition, in order to enable the flight controls to act on the flight control members of the aircraft, the control includes at least one primary rod hinged to a primary projection fastened to the pitch shaft.

The primary rod can then be connected to the flight control members via a mechanical linkage.

Nevertheless, it is possible for the aircraft to include electric flight controls. Thus, the flight control can comprise at least one primary sensor for sensing the position of the pitch shaft, this primary sensor optionally being controlled by the primary rod.

The flight control members of the aircraft are actuated depending on the position of the pitch shaft as measured by the sensor. For example, in a helicopter, the sensor delivers a signal relating to said position of the pitch shaft to a control member that acts on servo-controls for modifying the pitch of the blades of the main rotor of the helicopter.

Similarly, the flight control may include at least one secondary rod hinged to a secondary projection fastened to the roll shaft and/or to at least one secondary sensor for sensing the position of said pitch shaft.

Furthermore, the mechanical connection advantageously includes a compass linkage provided with first and second branches, the first branch of the compass linkage being hinged to the root of the control stick and to a first end zone of the second branch.

In a first variant of the invention, a second end zone of the second branch of the compass linkage is hinged to the roll shaft.

Consequently, by pivoting about the connection pin, and thus about the roll axis, the root of the control stick entrains in its movement the first and second branches of the compass linkage, and consequently entrains the roll shaft.

In contrast, by pivoting about the pitch axis, the root of the control stick pushes or pulls the first branch. The compass linkage then tends to open or close but does not give rise to any turning movement of the roll shaft.

In a second variant, the second end zone of the second branch of the compass linkage is mechanically connected to the roll shaft via transfer means comprising in succession a horizontal first transfer rod, a vertical transfer member, and then a horizontal second transfer rod, a ball-joint possessing a large amount of freedom to move angularly allowing maximum angular movement of plus or minus 20° being located between the second branch of the compass linkage and the first transfer rod of the transfer means.

By pivoting about the connection pin, and thus about the roll axis, the root of the control stick entrains in its movement the first and second branches of the compass linkage, and consequently entrains the first transfer rod.

The vertical transfer member then acts on the second transfer rod so that the second transfer rod moves in the direction opposite to the direction of movement of the first transfer rod. The second transfer rod acts on the roll shaft that then moves in the same direction of rotation as the control stick about the roll axis.

It should be observed that the first branch of the compass linkage, the first transfer rod, and the second transfer rod are substantially parallel in order to maximize the effectiveness of the flight control. Furthermore, the first transfer rod extends along the pitch axis, the first transfer rod's longitudinal axis coinciding with said pitch axis, thereby enhancing the decoupling between the pitch and roll controls.

In contrast, by pivoting about the pitch axis, the root of the control stick pushes or pulls the first branch that entrains the second branch of the compass linkage in rotation. Nevertheless, since the second branch is connected to the first transfer rod via a ball-joint presenting a large amount of freedom in angular movements, the first transfer rod also lying on the same axis as the pitch axis, there is no risk of any coupling phenomenon appearing.

Furthermore, the flight control advantageously includes support means for the mechanical connection, the support means being firstly fastened to the second branch and secondly secured to the pitch shaft.

More precisely, the support means are fastened to the second branch of the compass linkage via a hinge. Thus, when the pilot turns the control stick about the roll axis, the root of the control stick moves the first branch, said first branch causing the second branch to turn about its fastening points with the support means.

In addition, the support means are secured to the second end of the pitch shaft that passes through the second side face of the main anchor platform. The support means are thus constrained to turn with the pitch shaft.

Finally, it is possible to envisage providing a secondary anchor platform for anchoring the vertical transfer member to a structure of the aircraft in order to stabilize the flight control.

BRIEF DESCRIPTION OF THE DRAWINGS

The invention and its advantages appear in greater detail from the following description with embodiments given by way of illustration with reference to the accompanying figures, in which.

Elements shown in more than one of the figures are given the same references in each of them.

MORE DETAILED DESCRIPTION

Figure 1:
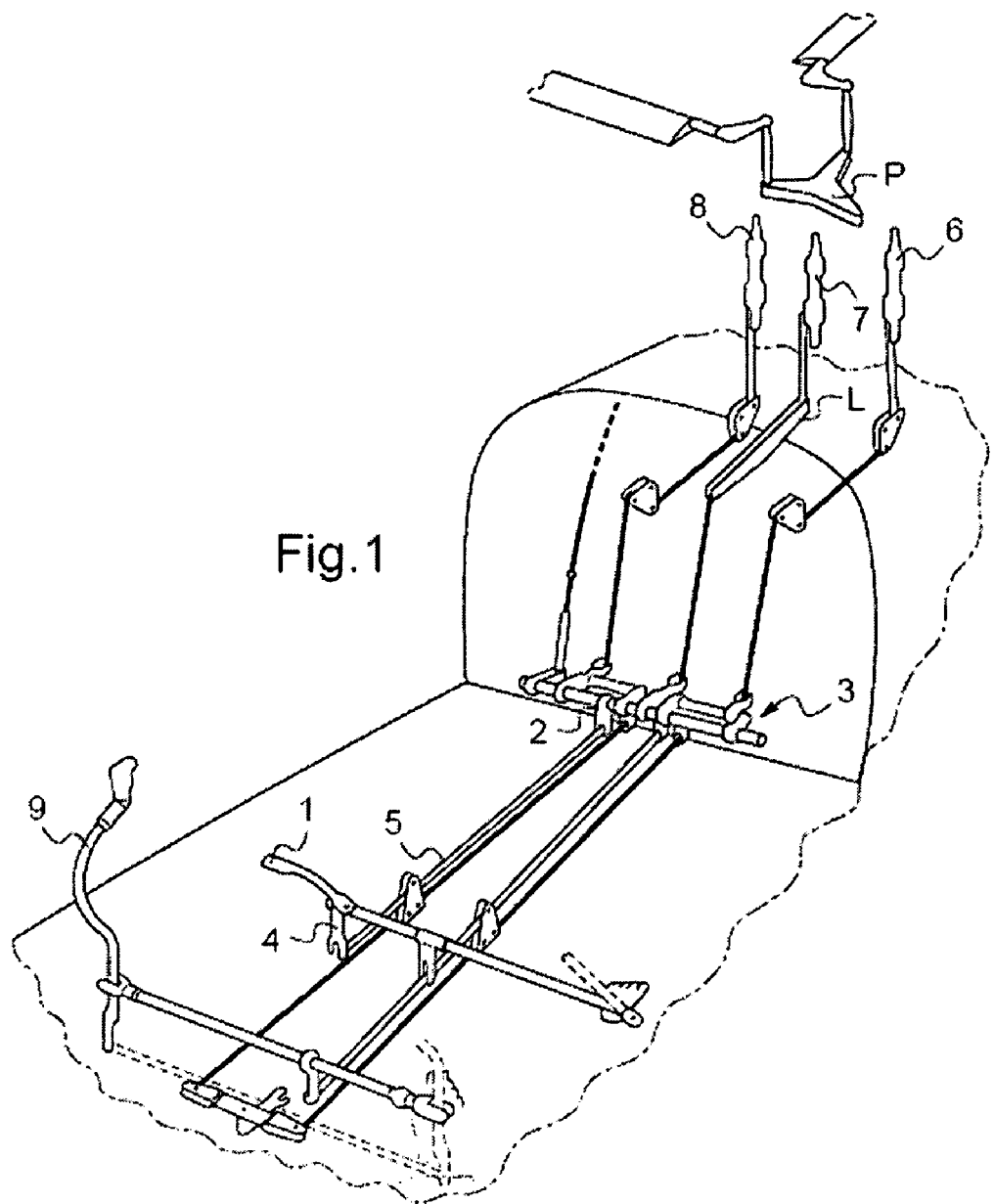
FIG. 1 is a diagrammatic view of the flight controls of a helicopter.

FIG. 1 is a diagrammatic view of the flight controls of an aircraft, more particularly of a helicopter.

Conventionally, the collective pitch lever 1 serves to modify the collective pitch of the rotorcraft blades. The collective pitch lever 1 is connected to a transfer lever 2 of a mixer 3 via an arm 4 and a connected rod 5. When the collective pitch lever 1 is pulled upwards, the mixer 3 transfers this control to the left, right, and longitudinal servo-controls 6, 7, and 8. These servo-controls then move by the same amount thus enabling the swashplate P to move upwards without tilting to increase the pitch of the blades of the main rotor of the rotorcraft. When the collective pitch lever 1 is lowered, the movement is reversed and the pitch of the blades decreases.

The roll and pitch flight control comprises a control stick 9 for control the swashplate P. When the control stick 9 is pushed forwards, the longitudinal servo-control 7 retracts via the longitudinal control line, and the tilt lever L thereby tilting the swashplate P forwards.

On a rotorcraft provided with electric flight controls, the pitch lever and the pitch and roll flight control are electrically connected to the servo-controls 6, 7, and 8.

The invention provides an aircraft fitted with pitch and roll flight control that is both compact and precise, without generating coupling between pitch and roll.

Figure 3:
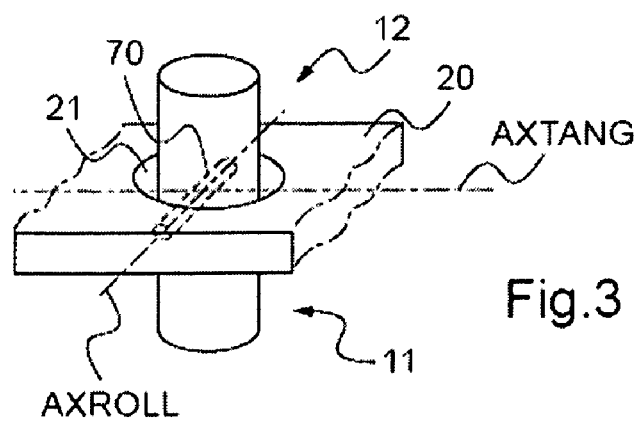
FIG. 3 is a view showing the control stick connection pin.
Figure 2:
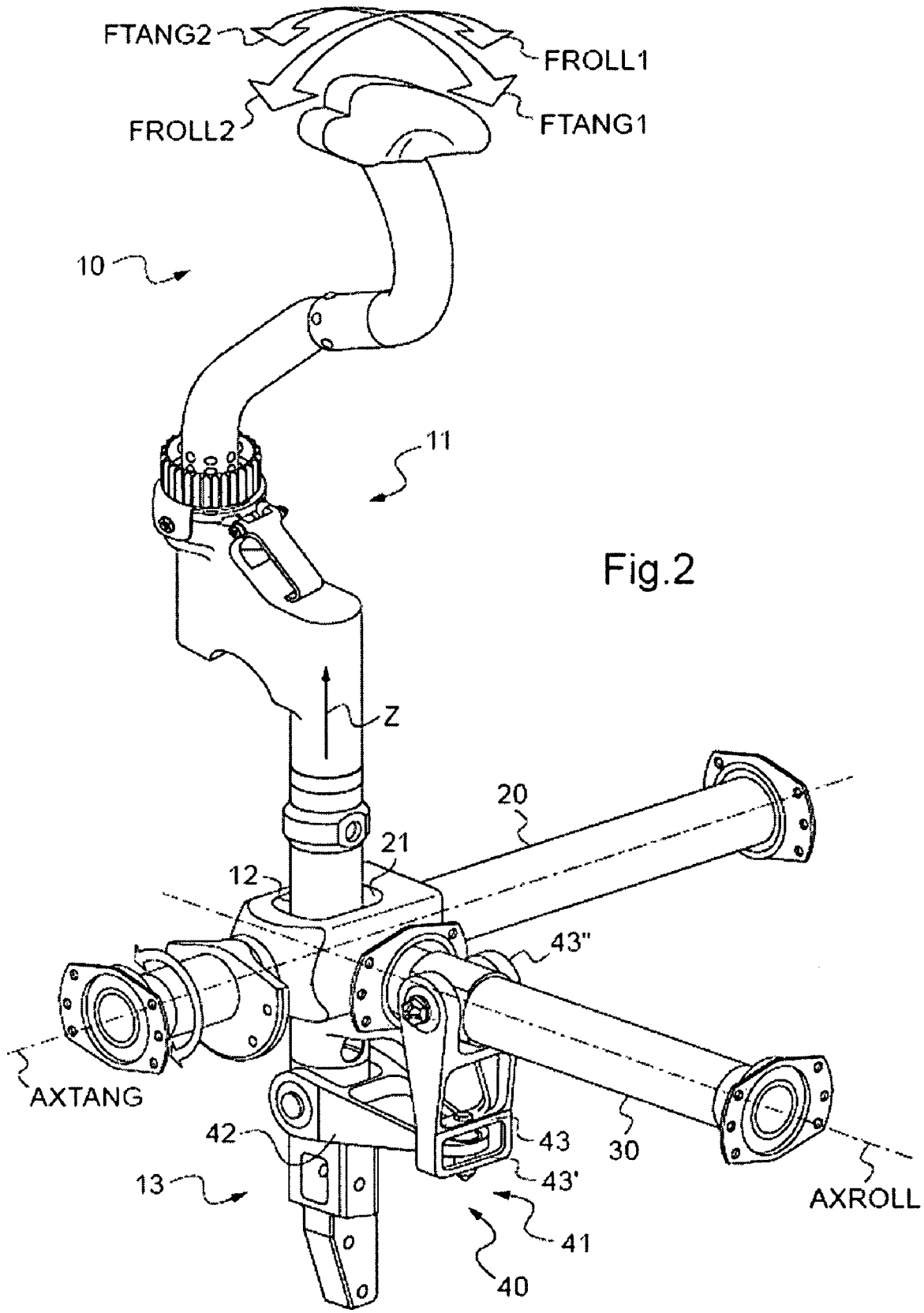
FIG. 2 is an isometric view of a first variant of a flight control.
Figure 4:
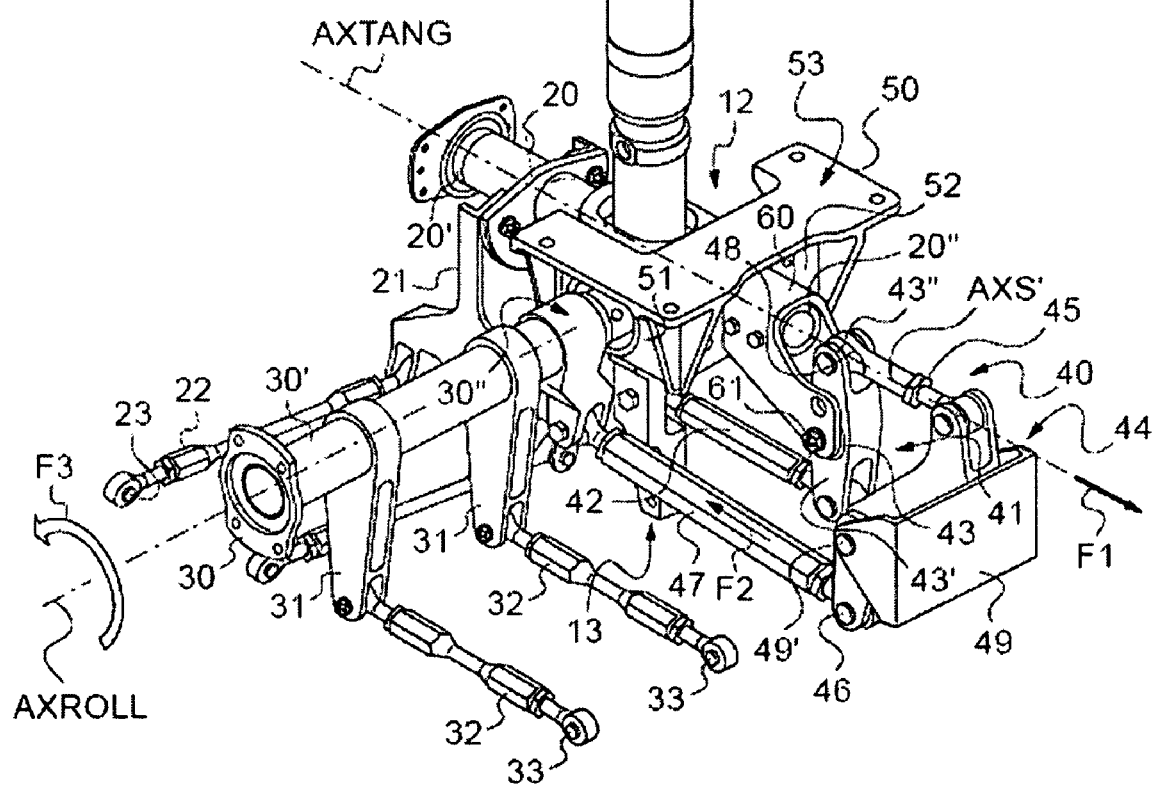
FIG. 4 is an isometric view of a second variant of a flight control.

With reference to FIGS. 2 to 4, the pitch and roll flight control 10 of the invention comprises a control stick 11 provided in succession with a handle 14, an intermediate segment 12, and a root 13.

By taking hold of the handle 14, the pilot can cause the control stick 11 to turn about a pitch axis AXTANG and a roll axis AXROLL, respectively along arrows FTANG1, FTANG2, and FROLL1, FROLL2.

It should be observed that the pitch and roll axes AXTANG and AXROLL are mutually perpendicular.

In addition, the flight control 10 is provided with a pitch shaft 20 and a roll shaft 30 that are directed respectively along the pitch and roll axes AXTANG and AXROLL. The pitch and roll shafts 20 and 30 are thus perpendicular to each other and substantially orthogonal to the control stick 11.

The roll shaft 30 is connected by a mechanical connection 40 to the root 13 of the control stick, while the pitch shaft 20 is pierced by the control stick 11, the control stick 11 being directed substantially along an elevation direction Z that is orthogonal to the pitch and roll axes AXTANG and AXROLL.

Consequently, the pitch shaft 20 is pierced so as to present an oblong orifice 21 passing through the pitch shaft 20.

The control stick 11 then passes through the pitch shaft 20, and more precisely through the oblong orifice 21 of the pitch shaft 20.

In addition, the control stick 11 is constrained to turn with the pitch shaft 20 about the pitch axis AXTANG.

With reference to FIG. 3, a connection pin 70 enables such a connection to be made.

The connection pin 70, fastened to the pitch shaft 20 in conventional manner, is arranged axially along the roll axis AXROLL. The longitudinal axis of symmetry AXS of this connection pin 70, e.g. a cylindrical barrel, therefore coincides with the roll axis AXROLL.

It can also be seen that the connection pin 70 passes through the oblong orifice 21, and naturally, the intermediate segment 12 of the control stick 11.

Consequently, the control stick 11 can turn about the connection pin 70, and thus about the roll axis AXROLL, without generating mechanical forces on the pitch shaft 20.

However, when the pilot pulls or pushes the control stick 11, the intermediate segment 12 and turns entrains the connection pin 70 and thus the pitch shaft 20. As explained below, by means of the mechanical connection 40, the control stick 11 does not generate mechanical forces on the roll axis, whatever the variant of the invention.

The pitch and roll flight control 10 thus enables pitch and roll to be effectively decoupled.

For this purpose, the mechanical connection 40 implements a compass linkage 41 having first and second branches 42 and 43. The first branch 42 of the compass linkage 41 is also hinged firstly to the root 13 of the control stick, and secondly to the first end zone 43' of the second branch 43, e.g. via a ball-joint connection.

In the first variant of the invention, shown diagrammatically in FIG. 2, the second end zone 43" of the second branch 43 is fastened to the roll shaft 30.

Consequently, when the pilot acts on the control stick 11 to cause the aircraft to pitch, the root 13 of the control stick 11 pushes or pulls the first branch of the compass linkage. The second branch 43 of the compass linkage 41 then tilts relative to the roll shaft, without entraining the roll shaft to turn about the roll axis AXROLL.

In the second variant of the invention, shown in FIG. 4, the second end zone 43" of the compass linkage is connected to the roll shaft 30 by transfer means 44 of the mechanical connection 40, which transfer means 44 are provided with a first transfer rod 45, an transfer member 46, and a second transfer rod 47.

Thus, the second branch 43" of the compass linkage is hinged to the first transfer rod 45 via a ball-joint 48 presenting a large amount of freedom in movement, the first transfer rod 45 itself being hinged to the transfer member 46. Finally, the transfer member 46 is connected to the roll shaft 30 by the second transfer rod 47.

It should be observed that the first and second transfer rods 45 and 47 are substantially horizontal and parallel to the pitch shaft 20, the first transfer rod 45 also being directed along the pitch axis AXTANG and having its own longitudinal axis of symmetry AXS' coinciding with said pitch axis AXTANG. In contrast, the transfer member 46 is substantially vertical and parallel to the control stick 11.

Thus, when the pilot moves the control stick along arrow FROLL1, the root causes the second branch 43" of the compass linkage 43 to move angularly and consequently causes the first transfer rod 45 to move linearly in a first direction F1.

The transfer member 46 then moves angularly and pushes the second transfer rod 47 in a second direction F2 opposite to the first direction F1. The roll shaft 30 then turns about the roll axis AXROLL as represented by arrow F3, i.e. in the same direction as the control stick 11.

As mentioned above, this movement of the control stick has no consequence for the pitch shaft 20 that remains in position.

Likewise, when the pilot tilts the control stick 11 about the pitch axis AXTANG, the control stick generates turning of the pitch shaft 20 via the connection pin 70.

In contrast, the ball-joint 48 allows the second branch 43 of the compass linkage 41 not to entrain rotation of the roll shaft 30.

In addition, the flight control includes support means 60 for the second branch 43 of the compass linkage 41.

These support means 60 are secured to the pitch shaft 20, and more precisely to the second end 20" of the pitch shaft 20. In addition, the support means 60 are hinged to the second branch 43.

Thus, movement of the root 13 of the control stick 11 about the roll axis AXROLL gives rise to turning of the second branch 43 of the compass linkage about its hinge 61 to the support means 60.

In order to be properly secured on board the aircraft, the flight control 10 optionally includes a main anchor platform 50 fastened under the cockpit floor of the aircraft via its top face 53.

The second end 30" of the roll shaft 30 is then hinged to a first side face 51 of the main anchor platform 50. Since the first end 30' of the roll shaft 30 is hinged to the structure of the aircraft, the roll shaft 30 is properly secured.

Likewise, the second end 20" of the pitch shaft 20 is hinged to a second side face 52 of the main anchor platform 50, said second end 20" of the pitch shaft 20 passing through the second side face 52. Since the first end 20' of the pitch shaft 20 is hinged to the structure of the aircraft, the pitch shaft 20 is properly secured.

It will be understood that the hinges of the pitch and roll shafts 20 and 30 to the structure of the aircraft and to the main anchor platform are of conventional type and enable these pitch and roll shafts 20 and 30 to perform rotary movement respectively about the pitch axis AXTANG and about the roll axis AXROLL under drive from the control stick 11.

Finally, the connection is optimized by fastening a secondary anchor platform 49 both to the structure of the aircraft and to the transfer member 46, the transfer member 46 being capable of turning about its fastener means 49' fastening it to the secondary platform 49.

The control stick is thus compact, robust, and capable of decoupling pitch and roll controls.

In order to transmit these controls to the flight control members of the aircraft, e.g. the servo-controls 6, 7, and 8, the flight control 10 includes a primary rod 22 hinged to a projection 21 on the pitch shaft 20.

Similarly, it is provided with at least one secondary rod 32 hinged to a projection 31 of the roll shaft, both secondary rods being visible in FIG. 4. The primary and secondary rods 22 and 32 can be mechanically connected to the servo-controls for implementing control, e.g. via the mixer 3.

Nevertheless, it is possible to implement flight controls that are electric.

The flight control 10 then possesses a primary sensor 23 for sensing the position of the pitch shaft 20, and at least one secondary sensor 33 for sensing the position of the roll shaft 30, these sensors being arranged respectively on the primary rod 22 and on the secondary rod 32 of the variant shown in FIG. 4.

As shown in FIG. 4, it is possible for the sensors to be provided redundantly, e.g. by providing two secondary sensors 33 arranged respectively on first and second secondary rods.

The position sensors then send information to a control member relating to the angular positions of the pitch and roll shafts 20 and 30, the control member then adjusting the lengths of the servo-controls.

Naturally, the present invention can be subjected to numerous variants in its implementation. Although several embodiments are described, it will be understood that it is not conceivable to identify exhaustively all possible embodiments. It is naturally possible to envisage replacing any of the means described by equivalent means without going beyond the ambit of the present invention.

What is claimed is:

1. An aircraft flight control comprising a pitch and roll control stick suitable for being turned about a pitch axis (AXTANG) and a roll axis (AXROLL) that are mutually perpendicular, said control stick being provided with a handle and a root interconnected by an intermediate segment of said control stick, wherein the flight control comprises a pitch shaft and a roll shaft that are mutually perpendicular for controlling the aircraft in pitching and rolling by performing turning movements respectively about said pitch and roll axes (AXTANG and AXROLL) under drive from said control stick, said control stick passing through an oblong orifice formed in said pitch shaft, said root is mechanically connected to the roll shaft by a mechanical connection while said intermediate segment is connected to the pitch shaft by a connection pin that passes through said intermediate segment and that is arranged axially in said oblong orifice, wherein said mechanical connection includes a compass linkage provided with first and second branches, said first branch being hinged to the root of the control stick and to a first end zone of the second branch.

2. A flight control according to claim 1, wherein said connection pin is a bar having said roll axis (AXROLL) as its longitudinal axis of symmetry (AXS).

3. A flight control according to claim 1, wherein said flight control comprises a main anchor platform anchoring it to said aircraft, and said roll and pitch shafts are fastened to said main anchor platform in such a manner as to be capable of performing rotary movements respectively about said pitch and roll axes (AXTANG and AXROLL).

4. A flight control according to claim 1, including at least one primary rod hinged on a primary projection fastened to said pitch shaft.

5. A flight control according to claim 1, that is provided with at least one primary sensor for sensing the position of said pitch shaft.

6. A flight control according to claim 1, including at least one secondary rod hinged to a secondary projection fastened to said roll shaft.

7. A flight control according to claim 1, that is provided with at least one secondary sensor for sensing the position of said pitch shaft.

8. A flight control according to claim 1, wherein a second end zone of the second branch of the compass linkage is hinged to the roll shaft.

9. A flight control according to claim 1, wherein a second end zone of the second branch of the compass linkage is mechanically connected to the roll shaft via transfer means comprising in succession a horizontal first transfer rod, a vertical transfer member, followed by a horizontal second transfer rod, a ball joint having a large amount of freedom in angular movement being placed between said second branch and said first transfer rod.

10. A flight control according to claim 9, wherein said first transfer rod extends along said pitch axis (AXTANG).

11. A flight control according to claim 9, wherein said ball joint can accommodate a maximum amount of angular movement of plus or minus 20°.

12. A flight control according to claim 9, including support means for supporting the mechanical connection, said support means being fastened firstly to the second branch and being secured secondly to the pitch shaft.

13. A flight control according to claim 9, including a secondary anchor platform anchoring the vertical transfer member to a structure of the aircraft.

\* \* \* \* \*